Aug. 29, 1961     H. V. SMITH ET AL     2,997,739
BINDER CURING OF FIBROUS MASSES
Filed Aug. 17, 1959     2 Sheets-Sheet 1
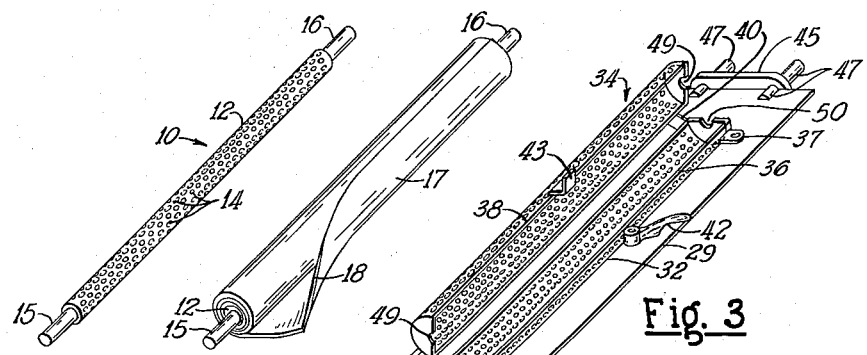
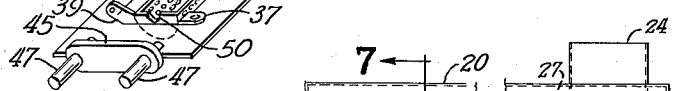
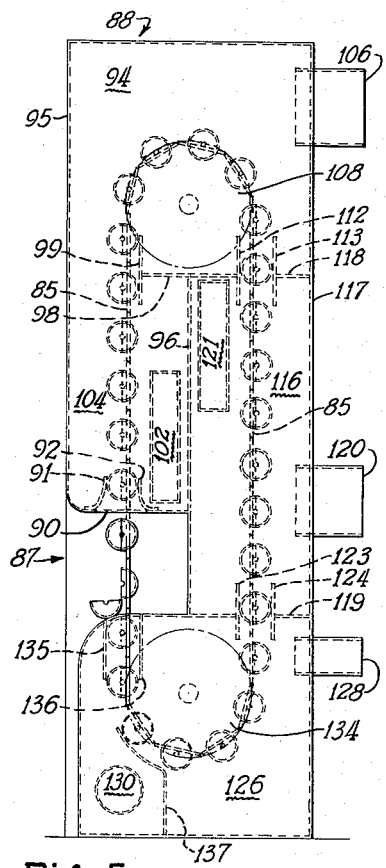
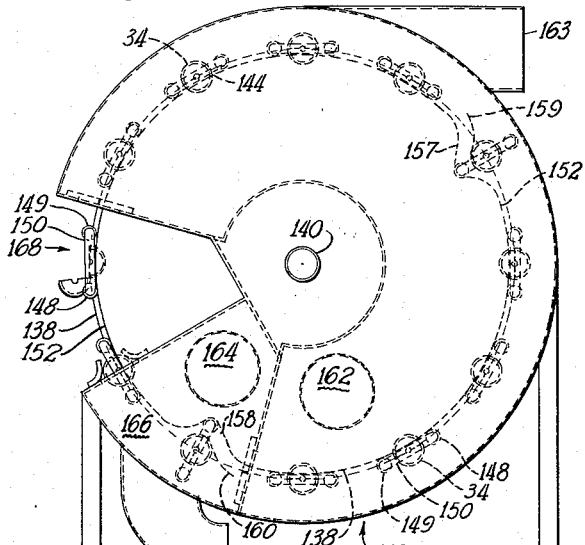
INVENTORS
HARRY V. SMITH, RICHARD S. GRANT
& WESTON C. JONES
BY
ATTORNEYS Aug. 29, 1961    H. V. SMITH ET AL    2,997,739
BINDER CURING OF FIBROUS MASSES
Filed Aug. 17, 1959    2 Sheets-Sheet 2
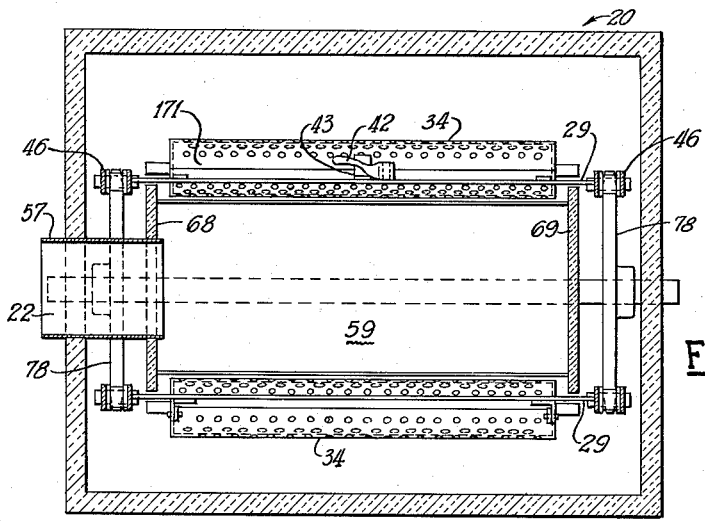
Fig. 7
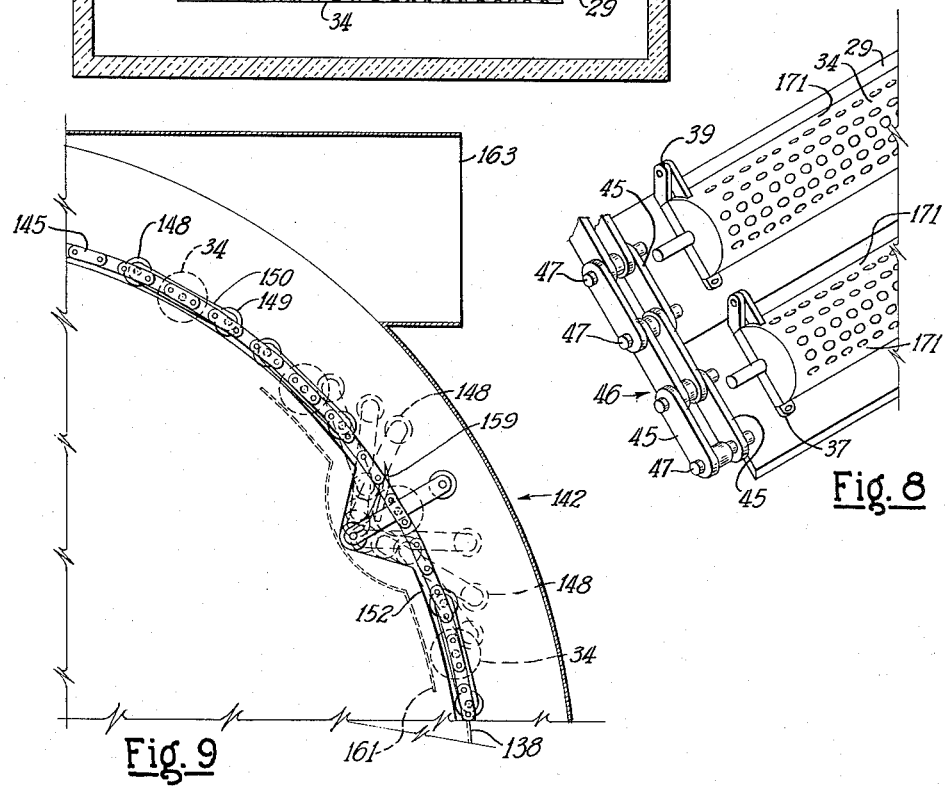
Fig. 8
Fig. 9
INVENTORS
HARRY V. SMITH, RICHARD S. GRANT
& WESTON C. JONES
BY
ATTORNEYS

1

2,997,739
BINDER CURING OF FIBROUS MASSES
Harry V. Smith, Richard S. Grant, and Weston C. Jones, Toledo, Ohio, assignors to Owens-Corning Fiberglas Corporation, a corporation of Delaware
Filed Aug. 17, 1959, Ser. No. 834,222
16 Claims. (Cl. 18—6)

This invention relates principally to cylindrical casings of mineral fibers intended for positioning around pipe as heat insulating covers but also capable of serving as independent ducts of self-insulating capacity. More particularly, this invention relates to methods and apparatus for curing the binder of such tubular bodies of glass or other mineral fibers.

The superior qualifications of fibrous glass masses as insulating media are well known. They possess not only high resistance to heat transfer but also the individual glass fibers have exceptional strength, and are chemically inert. They are thus able to withstand exposure to the corrosive action of moisture, mildew, and of other destructive elements.

An established method of making fibrous glass insulating products of this type involves the winding of a web of fibrous glass, impregnated with a heat curable binder, about a hollow, perforated mandrel until the desired thickness is secured. If not previously cut to the desired length, the wound section is severed from the balance of the web by a cutting blade, and then the binder of the cylinder mass of the wound web is cured by forcing hot air through the hollow mandrel and out radially through the mass, or by letting heat within an oven slowly soak into or permeate the porous fibrous body.

The basic web of fibrous glass or of comparable mineral fibers derived from fusible rock or slag of the type employed in this fabricating procedure is usually produced by attenuating minute streams of the molten base material with blasts of steam, hot gas, or air, and collecting the filaments thus formed, with an admixture of binder particles, upon a foraminous conveyor.

For the various uses for which they may be intended, the individual fibers thus drawn may have diameters anywhere from two hundred-thousandths, to eight-thousandths of an inch and be in lengths of one-half to ten inches. The rate of travel of the conveyor may be adjusted to control the thickness of the deposit of fibers and the continuous web thus created.

The web of fine fibers here involved is of a light, fluffy nature, easily elongated and compacted, and so readily adapts itself to the wrapping action. The winding of the web upon itself over the mandrel has a compressing effect increasing the density of the stock many times from an original weight per cubic foot, which may be as low as one-third of a pound, to a final weight usually not exceeding eight pounds.

The web may be directly wound on a mandrel or first cut to the lengths predetermined as suitable for building the cylindrical bodies of the selected size. These cut lengths may then be used immediately, or temporarily stocked for later processing. The length of the insulating sections formed are substantially the same as and limited by the width of the basic web. This dimension usually ranges between thirty-six and seventy inches.

The high order of thermal protection which these fibrous glass casings provide arises from the great number of small air cells or pockets disposed between the fine fibers. However, this desired insulating quality in the final product is present in the unfinished casings and slows up the binder curing by resisting the penetration of hot air or the conduction of heat to the interior of the formed bodies.

Where, in prior practices, heated air has been forced through the wrapping casing, it has generally been directed axially into or drawn endwise from a hollow mandrel having a ported surface. The necessarily limited diameter of the mandrel provides a narrow longitudinal path capable of handling only a low volume of air when it is considered that the air must carry heat to the full crosswise and lengthwise area of the cylindrical fibrous stock surrounding the mandrel.

The low volume of air necessarily has little velocity and pressure when released from the hollow mandrel and does not thoroughly nor equally penetrate the full body of the casing. Because of the limited flow of air and its unequal distribution, the curing of the casing proceeds slowly and some portions may be overcured while other sections may be incompletely cured.

It is, therefore, a principal object of this invention to provide a method and apparatus for more expeditiously and uniformly curing the binder of such bodies of fibrous glass.

Another object of the invention is to provide a method and apparatus for passing curing air diametrically through cylindrical casings.

A further object of the invention is the provision of apparatus which will handle a large number of casings for progressive and continuous curing of the binder thereof.

A more specific object of the invention is to provide means for driving curing air alternately in opposite directions through binder impregnated fibrous bodies.

A supplemental object of the invention is to provide a mold construction which facilitates the removal of a mandrel from the casing wrapped thereon.

The apparatus of the invention through which the above objects as well as other objects and advantages are attained includes a generally air impervious, conveyor for carrying a series of molds for the casings, and having the molds perforated and with a semi-cylindrical section extending out each side of the conveyor.

The apparatus of the invention further involves means for directing heated air from one side of the conveyor, through the perforated molds and the casings held therein, to the opposite side of the conveyor.

The invention further contemplates the inclusion of means for reversing the air flow through the molds, or alternate means for turning the molds so that air flow maintained in one direction will pass variously through the casings held in the molds.

The apparatus and methods of the invention will be further described hereafter in connection with the drawings in which:

FIGURE 1 is an isometric view of a mandrel adapted for use in the invention;

FIGURE 2 is a like view of the mandrel of FIGURE 1 with a length of fibrous glass webbing wrapped thereon;

FIGURE 3 is a perspective view of a plate of an apron conveyor designed according to this invention with a two-part, perforated mold mounted thereon;

FIGURE 4 is a longitudinal, vertical section, diagrammatic in nature, of a conveyor and curing oven embodying one form of the invention;

FIGURE 5 is a similar section of another form of conveyor and curing oven according to the invention;

FIGURE 6 is a vertical section of a drum type of conveyor and curing oven constituting a further embodiment of the invention;

FIGURE 7 is a cross section of the apparatus of FIGURE 4, as viewed from the line 7—7 thereof;

FIGURE 8 is a partial perspective view of two adjacent conveyor plates and associated molds, the latter being of a design somewhat modified from that shown in FIGURE 3; and FIGURE 9 is an enlarged sectional view of a portion of the drum conveyor apparatus shown in FIGURE 6.

Referring to the drawings in more detail, the bare mandrel 10 shown in FIGURE 1 has a hollow center section 12 with its axial chamber vented to the exterior through the series of closely positioned ports 14. Solid stub shafts 15 and 16 project from opposite ends of the section 12. The stub shafts may be of a standard diameter such as one inch, irrespective of the size of the section 12, to reduce the need of changes in parts receiving the shafts in associated apparatus.

In FIGURE 2 a length of fibrous glass mat or web 17 is shown quite completely wound upon the center section 12 of the mandrel 10. For the tubular insulating products here involved, this web 17 preferably has a minimum weight of sixteen grams per square foot with an average of eighteen grams, and a one inch thickness, as uniform as possible, resulting in a density of one-half pound per cubic foot.

A fairly fine fiber between fifteen and thirty hundred-thousandths of an inch in diameter is recommended for creating the web. A mass of such fibers has exceptional insulating properties and is readily shaped and compacted. A specific size within the cited range which has given excellent service is twenty-four hundred-thousandths.

In the forming of the web with these fibers, a binder of a combination of melamine and phenolic formaldehyde resins is introduced in a proportion of eight to ten percent by weight. The melamine constituent has exceptional qualities of hardness and abrasion resistance while the phenolic has special chemical resistance properties. They both have strong binding power. Thermosetting epoxy, and either a phenolic or melamine resin alone also function quite satisfactorily in the binder compositions.

A density of three and one-half pounds per cubic foot in the completed tubing is thought about right, from an overall commercial standpoint. However, there may be demands for weights anywhere in the region of two and one-half to seven pounds. These weights would be entirely feasible to produce.

The heavier stock has considerably greater strength and would thus be better qualified to serve as self supporting conduit. In connection therewith a larger percentage of binder would aid in establishing a more impervious wall section, although a sealing liner or cover of film or foil should be added.

For purposes of explanation, it will be considered that the mandrel 10 has a center section 12 with a diameter of two inches for building a tubular insulation of like inside diameter, and that it is desired to provide the tubular product with a wall thickness of one inch and a density of three and one-half pounds.

Starting with an original web of one inch thickness and one-half pound density, it is determined that the web must be wound upon the mandrel seven overlapping turns and applied with sufficient tension or pressure to be compacted down to one-seventh of its original thickness. On this basis, the length of the web should be approximately five and one-half feet.

In wrapping the web upon the mandrel, rollers may be utilized for automatic processing or the operation may be taken care of by hand, using pre-cut sections.

It is preferred that the web units be cut in a manner to give a ragged edge, such as resulting from hand tearing, as this enables a smoother joint to be made between the ends of the web section and the adjoining turns of the web at the beginning and at the finish of the winding action. It has also been found that wetting the final edge 18 with water makes it lie more evenly and merge better with the underlying web course. To facilitate removal of the tubular casing after curing, the mandrel is given a wax coating before the web is wound thereon.

The apparatus embodying one form of the invention shown in FIGURES 4 and 7 includes an oven 20 with a side inlet 22 for heated binder curing air and a top outlet 24 for the exhaust of the heated air. The air so discharged may, of course, be cleaned and reheated for recirculation.

An apron type conveyor 27 is mounted for movement into and out of the oven 20. This conveyor is constructed with a series of plates 29, one of which is shown in FIGURE 3. A rectangular opening 32 in each plate is adapted to receive a perforated mold 34. The mold 34 has a lower section 36 secured by bolts through flanges 37 to the plate 29 and extending to a substantial extent below the plate. For molds of different diameters, the sections 36 may be mounted in plates for spanning openings 32 made large enough to receive the largest mold involved.

An upper mold part 38 is hinged at 39 and 40 for opening and closing movement away from or against the lower section 36. A latch 42 on the lower section is provided for holding the mold in closed position by engaging the hook 43 on the upper part 38. Means, such as cams controlled mechanically or electrically through limit switches may be provided for opening and closing latches 42 automatically.

Each end of each plate 29 is secured to a link 45 of one of the conveyor chains 46. This attachment may be accomplished by welding the end of the plate within slotted extensions of the chain pins 47. Alternately, a piano hinge arrangement may be provided between edges of the plates 29 to form a continuous chain of plates pivotable in relation to each other.

A mandrel with an uncured casing wrapped thereon is set within a mold 34 at the loading station 48 exteriorly of the oven 20. The ends of the two parts of the mold have arcuate slots 49 and 50 for fitting around the projecting stub shafts of the mandrel. With the casing in place in the mold, the upper section 38 of the mold is closed and locked in position by manual operation of the latch 42.

The molds 34 then proceeds with the upper flight of the conveyor into the oven 20. At the entrance 55 of the oven, a pair of flexible flaps 52 and 53 allow the mold to enter while sealing the entrance 55 against outward flow of air.

As the series of filled molds 34 travel horizontally across the oven upon the upper flight of the conveyor, air heated preferably to a temperature between 375 and 475° F. is admitted below the flight through air inlet 22. This air travels through conduit 57 into plenum chamber 59 defined by the front wall 61 of the oven and the opposed vertical partition 63 spaced adjacent the sprocket 64. The partition 63 has laterally extending flanges 66 and 67 which block the air from bypassing between the top and bottom of the partition and molds traveling past these points.

The other pair of sides of the chamber 59 are enclosed by the vertical walls 68 and 69 seen in FIGURE 7. These extend laterally between the oven wall 61 and the partition 63. The top edges of the walls 68 and 69 have bearing and sealing contact with the end portions of the plates 29 of the upper flight, and the lower edges of the walls have like sealing contact with the plates on the lower flight of the conveyor.

The air is thus confined within chamber 59, except for the perforated molds 34. The heated air, therefore, travels outwardly from inlet 22 into the exposed portions of the molds not only as they travel across the upper portion of the conveyor, but also as they return toward the unloading and loading station 48 upon the lower flight. In order to insure full crosswise travel of the air diametrically through the casings, the portions 171 of the mold parts immediately adjacent the plates 29 may be left blank as shown in FIGURES 7 and 8. These blank areas create, in effect, an air channel with substantially parallel, opposite sides. The air is thus prevented from cutting in and out of the mold and enclosed casing from one to the other side of a conveyor plate.

In its passage through a casing, a portion of the air crosses through the hollow center section 12 of the mandrel 10. This hollow section thereby contributes to the curing of the binder in the fibrous stock immediately above and below it. However, with casings with small inner diameters for which the mandrel is necessarily reduced in size, the center section thereof need not be so perforated. After passing through the casings within the molds and thus curing the binder thereof, the air is forced out the exhaust 24.

The conveyor outlet 72 from the oven has a pair of sealing flaps 74 and 75. As the molds travel with the conveyor around sprocket 78 exteriorly of the oven, they are opened for the removal of the casings and for introduction of new uncured casings.

Instead of having the molds fixed to the conveyor, they may, of course, be designed for removal, for instance by having a flange extension to be engaged by latches such as 42. The loading of the molds may thus be effected prior to attachment to the conveyor. This would also facilitate final removal of the mandrels from the casings wrapped thereon as the molds may be used to hold the mandrels securely while the withdrawing pressure is applied to the projecting end shafts of the mandrels.

The apparatus embodied in FIGURE 5 is generally similar to that of FIGURE 4. It has a conveyor 85, the flights of which, however, run vertically instead of horizontally as in the apparatus of FIGURE 4. The apparatus further differs by providing two-directional flow of the curing air.

The opening 87 at one side of the oven 88 constitutes the loading and unloading station. In this design of apparatus the loaded molds 34 travel upwardly from the loading station through an entrance 90 controlled by a pair of sealing flaps 91 and 92.

The first compartment 94 of the oven 88, through which the molds 34 first travel and which is divided by the conveyor 85, is bordered on the outside by oven wall 95 and has a back wall 96 with an upper partition 98 extending horizontally to a baffle 99. The latter prevents the escape of air on that side of the conveyor upwardly past the molds.

Heated air is supplied through inlet 102 into the plenum chamber on the right side of the ascending conveyor and passes laterally through the perforated molds and the casings held therein into the area 104 of compartment 94 on the left hand side of the upwardly traveling conveyor, as viewed in FIGURE 5. This air then moves across the upper portion of the oven to be discharged through the exhaust outlet 106.

The molds 34 travel with the conveyor 85 around the upper sprocket 108 and then proceed downwardly through the tunnel seal formed by the two parallel plates 112 and 113. They are thus brought into chamber 116 which is defined in part by the inner wall 96, the outer oven wall 117, and upper and lower partitions 118 and 119.

While in chamber 116, heated curing air is driven through the molds from the outside area. This causes the air to go through the molds in a reverse direction from that followed by the air in compartment 94. This second division of air is admitted to chamber 116 through inlet 120 and is exhausted therefrom through outlet 121.

The molds then pass through the lower air seal formed by plates 123 and 124 into a cooling compartment 126. Air is supplied to this compartment through inlet 130 and is vented therefrom through outlet 128. While in compartment 126, the molds travel around the lower sprocket 134 and then, sufficiently cooled for handling, move upwardly past air baffling plates 135 and 136 into the loading and unloading station 87. To facilitate removal of the cured casings and insertion of newly formed ones in the molds, the conveyor may be driven with a step by step movement.

By driving the heated air in two directions through the molds as arranged in the apparatus of FIGURE 5, the binder content of the casing is cured more thoroughly and more uniformly. If the flow of the heated air is maintained in one direction through the molds throughout the full curing operation as in the apparatus of FIGURE 4 burning or overcuring of the air entering portions of the casings may occur with incomplete curing of the opposite or outlet portions.

The apparatus embodying a different form of the invention shown in FIGURES 6 and 9 comprises a solid drum 138 mounted for rotation on a horizontal shaft 140 within a cylindrical oven 142. Rectangular slots 144 are cut into the flat, peripheral facing of the drum. These slots 144 are shaped to receive molds 34 which are held in position within the slots by their pivotal attachment to chains 145.

Rollers 148 and 149 are mounted at the ends of cross bars 158, secured across the ends of the molds. The rollers ride upon a track 152 which is circular for a major portion of its path around the drum. However, at points 157 and 158, the track moves radially inwardly and with the cooperation of roller guide strips 159 and 160, rotate the molds 34 on their longitudinal axes in arcs of 180 degrees. As a result of this rotation, the heated air from the inlet 162 first travels through the molds in one direction for half of their travel around the drum, and then with a change of position of the molds, the air travels through them in the opposite direction to reach the outside of the drum 138 and to be exhausted through the outlet 163. A baffle 161 is preferably placed within the drum at pivot points 157 and 158 to reduce leakage of air through slots 144 and past the molds as they are being turned.

To bring the molds to a handling temperature, they are submitted to cooling air from the inlet 164 as they travel through compartment 166, which is just below the loading and unloading station 168. The cooling air is exhausted from compartment 166 through the outlet piping 169.

Following removal of the casings from the molds at the station 168, the mandrels are extracted therefrom and the ends of the casings may be trimmed and the casings slit lengthwise should they be intended as pipe covering.

Instead of being forced to follow a constricted path endwise through the hollow mandrels, in the subject apparatus the heated air is directed diametrically through the full length and cross section of the wrapped casings. This permits the air to be utilized in high volume. Accordingly, a greatly increased amount of binder curing heat may be quickly transferred to the casing stock.

At the same time, with the change in position of the wrapped casings secured through rotation of the molds, the heat carrying air reaches uniformly through the bodies of the casings.

For best results, the air supply blowers or fans and the associated piping should have a capacity to deliver air into the ovens and against the casing molds at a minimum velocity estimated at fifty feet per minute.

The amount of curing air that is thus forced to pass transversely through the casing bodies may be estimated to average at least twelve times the volume that may be directed through them when the path for the air includes a hollow mandrel as in prior apparatus. It thus may be easily understood how the subject apparatus and methods will cure the binder of the wrapped casings many times faster and more effectively than has been previously possible.

Using a moderate temperature best adapted to properly cure the binder, whereby its adhesive properties and durability are most thoroughly developed, and with a medium rate of air flow, insulating casings may be cured with the subject apparatus and method in a period generally ranging from two to three minutes. For casings of the largest sizes this period may be somewhat extended. This timing compares to at least twenty to thirty minutes required in older procedures.

With high velocity air travelling at the speed of three hundred feet per minute and delivered under pressure equivalent to four or five inches of a water column, the curing time of the disclosed method may be brought down to as low as twenty to thirty seconds. With such fast curing, it is advisable to have means for automatically loading and unloading the molds.

This automatic equipment has the additional advantage of removing the need for cooling the molds for manual handling. With cooling compartments 126 and 166 omitted, there would be a saving of the substantial amount of fuel otherwise required in reheating the molds.

While three different designs of apparatus are disclosed herein, it should, of course, be understood that the features of any one of the forms are generally adaptable for incorporation in either of the others. For instance, mold rotating means, such as used with the drum conveyor of FIGURE 6 could be added to the conveyors of FIGURES 4 and 5. Likewise, the partitioning arrangement by which the curing air is directed in alternate directions through the molds of FIGURE 5 may be introduced within the apparatus of FIGURES 4 and 6.

In summary, it may be noted that the features of this invention include apparatus for directing high volume air in a confined path laterally through the full length of the fibrous bodies and alternating the direction of air flow through the bodies, and also apparatus for handling a large number of the fibrous bodies for progressive and continuous curing of the impregnating binder. Mandrel supported wrapped casings of cylindrical shape have been discussed herein, but it is, of course, obvious that certain aspects of the invention are also of value in treating other shapes of fibrous bodies whether or not mounted on mandrels.

While for purposes of illustration, particular specifications have been referred to in describing the fibrous glass material, the insulating casings, the air velocity and the structure of the apparatus, such figures and data should be taken as examples only, as the invention is, of course, adaptable to conditions and elements of other specifications and characteristics.

We claim:

1. Apparatus for applying binder curing heat to binder impregnated fibrous products including a generally closed-surface conveyor, perforated molds for such fibrous products lodged within openings in the conveyor, a perforated portion of each mold exposed on each side of the conveyor, driving means moving the conveyor along a set path, means adjacent the path of the conveyor forming a plenum chamber with the conveyor constituting one side thereof, and means forcing heated air for curing the binder of the products from the plenum chamber into the exposed portions of the perforated molds on that side of the conveyor, diametrically through the products held therein, and out the exposed portions of the perforated molds on the other side of the conveyor.

2. Apparatus according to claim 1 in which the exposed portions of the molds project from the sides of the conveyor and said portions are free of perforations immediately adjacent the conveyor.

3. Apparatus according to claim 1 in which the molds include mandrels around which the products are disposed.

4. Apparatus according to claim 3 in which the mandrels have perforated hollow sections providing paths for the air forced through the products.

5. Apparatus according to claim 1 in which the molds are elongated with a cylindrical cross section and are lodged longitudinally within the openings in the conveyor.

6. Apparatus according to claim 5 in which the molds are in two separable parts and one of the parts is fixed to the conveyor.

7. Apparatus according to claim 1 in which there are means for turning the molds while they are travelling with the conveyor.

8. Apparatus according to claim 1 having a second plenum chamber on the opposite side of the conveyor and spaced along the path of the conveyor from the location of the first mentioned plenum chamber, and means for supplying heated curing air to said second plenum chamber and forcing the air diametrically through the perforated molds and the products held therein.

9. Apparatus for applying binder curing heat to binder impregnated cylindrical bodies of fibrous glass including a generally closed-surface conveyor, perforated molds for such fibrous bodies lodged lengthwise within openings in the conveyor, a perforated, semicylindrical portion of each mold exposed on each side of the conveyor, driving means moving the conveyor along a set path, means adjacent the path of the conveyor forming a plenum chamber with the conveyor constituting one side thereof, and means forcing heated air for curing the binder of the bodies from the plenum chamber into the exposed portions of the perforated molds on that side of the conveyor, diametrically through the bodies held therein, and out the exposed portions of the molds on the other side of the conveyor.

10. Apparatus according to claim 9 in which a series of coplanar rectangular plates positioned crosswise of the conveyor form the generally closed-surface of the conveyor, and the openings in the conveyor extend lengthwise in said plates.

11. Apparatus according to claim 10 having a chain on each edge of the conveyor forming a part thereof, pivoted links in said chains, and fixed connections between the ends of the plates and certain links in said chains.

12. Apparatus for applying binder curing heat to binder impregnated fibrous products including a generally closed-surface conveyor of drum shape, perforated molds for such fibrous products lodged within openings in the conveyor, a perforated portion of each mold exposed on each side of the conveyor, driving means rotating the conveyor, means interiorly of the conveyor forming a plenum chamber with the conveyor constituting one side thereof, and means forcing heated air for curing the binder of the products into the plenum chamber from the exposed portions of the perforated molds on the interior side of the conveyor, and diametrically through the products held therein, and out the exposed portions of the perforated molds on the outer side of the conveyor.

13. Apparatus according to claim 12 in which there are means for rotating the molds while they are travelling with the conveyor.

14. A method of curing the binder of a binder impregnated, air permeable fibrous mass comprising enclosing the mass in a perforated mold, preventing air flow exteriorly past the mold by fixing the mold within an encircling partition member having substantially line contact only with a mid-section of the mold around the full periphery thereof, and forcing heated air for curing the binder from one side of the partition member through the mold and the fibrous mass therein to the other side of the partition member.

15. A method according to claim 14 in which the mold is of elongated cylindrical shape and the line contact between the partition member and the mold extends around the mold along the elongated dimension thereof leaving a hemi-cylindrical portion of the mold exposed on each side of the partition member.

16. A method according to claim 14 in which the mold and the partition member are carried on a conveyor and the conveyor acts with the partition member in preventing air flow exteriorly past the mold.

References Cited in the file of this patent

UNITED STATES PATENTS

| | | |
|---|---|---|
| 2,027,634 | Clayton | Jan. 14, 1936 |
| 2,321,756 | Kyle | June 15, 1943 |

FOREIGN PATENTS

| | | |
|---|---|---|
| 560,365 | Canada | July 15, 1958 |